UNITED STATES PATENT OFFICE 2,520,993

WATER-LEVEL INDICATOR

Carl W. Berger, McPherson, Kans., assignor to The Inventors Guild, Newark, N. J., a partnership No Drawing. Application April 6, 1946,
Serial No. 660,288

5 Claims. (Cl. 252—408)

This invention deals with a composition for locating the water level in the bottom of oil tanks and other locations. More specifically, it relates to a composition which may be coated on a stick, gage rod, or other probe so that it may be inserted in the location to be tested.

In oil refineries and other industries it is often desired to find the amount of water resting in a tank, particularly when such tank is partially filled with oil. The present method provides a simple and inexpensive solution to this problem.

In this invention, a composition is employed which turns color, from blue to white, when it comes in contact with water or other liquid having aqueous properties (such as the lower alcohols, acetone, glycols, acetic acid, and the like). The term "aqueous liquid" will be employed herein to designate such substances having solubility characteristics similar to those of water, as distinguished from "oily liquids" (such as petroleum or coal tar oils, esters, halogenated hydrocarbons, etc.) which do not effect a change in color of the composition of the present invention.

The present composition employs a reaction product of a water soluble cobalt salt (such as cobalt chloride or sulfate) with a water soluble thiocyanate (such as ammonium or sodium thiocyanate), admixed with a filler having a color other than that of the blue cobalt reaction mixture. Other ingredients may be added to give a stable uniform coating which may be applied on paper, wood, metal or any other material to be employed as a probe.

The invention may be more clearly understood by reference to the following examples which illustrate some of the many phases involved in the present invention:

Example 1

A composition is made up of the following ingredients:

3.5% by wt. cobalt chloride
3.5% by wt. ammonium thiocyanate
30% by wt. syrup
63% by wt. whiting (calcium carbonate)

The cobalt chloride, with sufficient water to make a solution, is first reacted with the thiocyanate (with sufficient water to make a solution), and the syrup and whiting are then added and stirred until a dark blue paste of medium consistency is obtained.

When this paste is applied to the end of a tank gage, and the gage is inserted in an oil tank and withdrawn, the portion of the paste which comes in contact with water has a white color (of the whiting), while the blue color of the remaining portion of the paste is unchanged, thereby giving a sharp line of demarcation between the two liquid layers.

Example 2

About 5% of the reaction product of cobalt nitrate and ammonium thiocyanate (1 mole of former to 2 of latter) is mixed in with 95% of a paste made by mixing molasses with finely-crushed red slate. About 0.05% of resorcinol or salicylic acid is added as a fungicide. The mixture possesses a blue color.

When a sheet of paper coated with this paste is partially inserted into water and withdrawn, the part immersed in water will be found to have the color of the red slate while the portion untouched by water is still blue.

Instead of the syrup, any other thick or viscous water-soluble material may be used, such as polyvinyl alcohol, dextran, starch paste, and the like. Although a 1:2 mole ratio of cobalt salt and thiocyanate is preferable, any ratio may be employed which gives a bluish tinge to a filler material. As a filler, one may employ wood dust, chalk, clay, diatomaceous earth, crushed resins of colors other than that of the cobalt reaction mixture, and the like. The reaction mixture may be soaked on paper, cloth, or wood or other similar material, in which case such material acts as the "filler."

As fungicide or mold inhibitor, besides those mentioned, one may use calcium propionate, salicylanilide, mercury organic derivatives, and the like.

In case the mixture is impregnated in paper or cloth, the use of the thick or viscous water soluble component may be dispensed with, the color shown by the water-wet portion being the original color of the paper or cloth. It is also possible to employ a finely divided filler, such as chalk, impregnated with the cobalt reaction product as a sizing material on the test paper or cloth to be used for determining water levels.

I claim:

1. A water level indicating composition comprising a water soluble cobalt thiocyanate, and a finely dispersed filler material having a color other than that of said thiocyanate, the amount of the thiocyanate being sufficient to color the filler material.

2. A water level indicating composition comprising a water soluble cobalt thiocyanate, a finely dispersed filler material having a color other than that of said reaction mixture, and a water soluble viscous material for binding the composition into a paste-like consistency, said thiocyanate being present in an amount sufficient to color the filler material.

3. A water level indicating composition according to claim 2 to which is added a mold inhibitor.

4. A water level indicating composition according to claim 2 comprising a paste containing approximately 3.5% by weight of a water soluble cobalt salt, 3.5% by weight of a water soluble thiocyanate salt, 30% syrup, and 63% whiting.

5. A water level indicating composition according to claim 4 in which the cobalt salt is cobalt chloride and the thiocyanate salt is ammonium thiocyanate.

CARL W. BERGER.

REFERENCES CITED

The following references are of record in the file of this patent:

UNITED STATES PATENTS

| Number | Name | Date |
|---|---|---|
| 384,804 | Weiss | June 19, 1888 |
| 2,254,609 | Kinzer | Sept. 2, 1941 |

FOREIGN PATENTS

| Number | Country | Date |
|---|---|---|
| 345,672 | Great Britain | Mar. 23, 1931 |